(12) United States Patent
Beloin et al.

(10) Patent No.: US 9,969,597 B2
(45) Date of Patent: May 15, 2018

(54) ELEVATOR COMMUNICATION GATEWAY

(71) Applicant: OTIS ELEVATOR COMPANY, Farmington, CT (US)

(72) Inventors: Brian Beloin, Avon, CT (US); Luis C. Encinas Carreno, Farmington, CT (US); Michael Garfinkel, West Hartford, CT (US); Derk Pahlke, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 52 days.

(21) Appl. No.: 15/065,456

(22) Filed: Mar. 9, 2016

(65) Prior Publication Data

US 2016/0264377 A1 Sep. 15, 2016

Related U.S. Application Data

(60) Provisional application No. 62/130,103, filed on Mar. 9, 2015.

(51) Int. Cl.
*B66B 1/34* (2006.01)
*H04M 3/51* (2006.01)

(52) U.S. Cl.
CPC ......... *B66B 1/3461* (2013.01); *H04M 3/5183* (2013.01)

(58) Field of Classification Search
CPC .................. B66B 1/3461; H04M 3/5183
See application file for complete search history.

(56) References Cited

U.S. PATENT DOCUMENTS

| | | | | |
|---|---|---|---|---|
| 5,345,046 A | * | 9/1994 | Rynaski | H04M 11/04 187/390 |
| 7,426,981 B2 | * | 9/2008 | Bacellar | B66B 1/34 187/247 |
| 2003/0198198 A1 | * | 10/2003 | Echavarri | H04W 88/021 370/328 |
| 2003/0227540 A1 | * | 12/2003 | Monroe | G08B 13/19634 348/14.02 |
| 2004/0007430 A1 | * | 1/2004 | Motoyama | B66B 1/34 187/391 |
| 2012/0051449 A1 | * | 3/2012 | Bunter | B66B 5/0087 375/259 |

(Continued)

*Primary Examiner* — Nafiz E Hoque
(74) *Attorney, Agent, or Firm* — Canotor Colburn LLP

(57) ABSTRACT

A communication gateway device to facilitate communication between at least one elevator car, a call center system, and a third party device includes a cellular communication interface including a digital cellular interface and an analog cellular interface, a wired telephone communication interface including a digital wired telephone interface and an analog wired telephone interface, and an elevator communication interface to send and receive an elevator communication to and from at least one elevator communication device associated with the at least one elevator car, the elevator communication interface associated with the cellular communication interface and the wired telephone communication interface to send and receive the elevator communication to and from at least one of the call center system and the third party device via at least one of the digital cellular interface, the analog cellular interface, the digital wired telephone interface, and the analog wired telephone interface.

11 Claims, 1 Drawing Sheet

(56) References Cited

U.S. PATENT DOCUMENTS

2013/0272506 A1\* 10/2013 Rytila ................... B66B 5/0093
　　　　　　　　　　　　　　　　　　　　　　379/27.02
2016/0176678 A1\* 6/2016 Kusserow ............. B66B 5/0018
　　　　　　　　　　　　　　　　　　　　　　187/393

\* cited by examiner

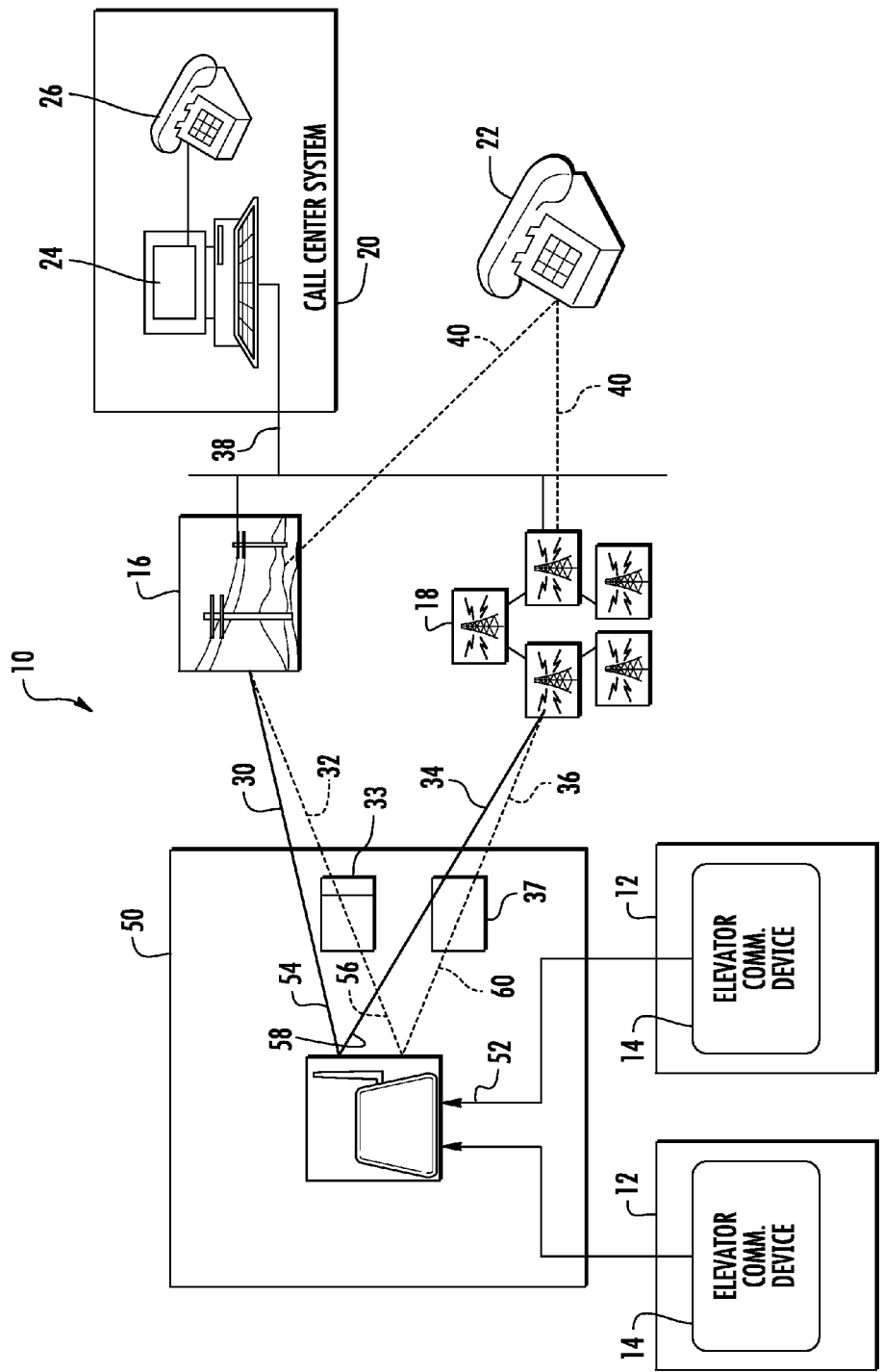

ELEVATOR COMMUNICATION GATEWAY

DOMESTIC PRIORITY

The present application claims priority to U.S. Provisional application 62/130,103 filed on Mar. 9, 2015 titled "ELEVATOR COMMUNICATION GATEWAY," assigned to the assignee hereof and expressly incorporated by reference herein.

FIELD OF THE INVENTION

The subject matter disclosed herein relates generally to the field of elevator communications, and more particularly to a gateway device for elevator communications.

DESCRIPTION OF RELATED ART

Elevator communication systems allow elevator occupants to communicate during elevator service interruptions, malfunctions, and other elevator service events. Elevator occupants may communicate with various entities, including building management, dedicated call centers, and technicians to provide allow for technician dispatch, remote diagnostics and identification, and other functionality.

Elevator service providers may utilize various connectivity solutions, including digital and analog transmission methods, and wired and wireless communications. Further, advanced functionality, including device identification, remote instructions, video feeds, and multiple sessions are often desired to provide optimal service. A device and method that can provide both digital and analog transmissions to an elevator system is desired.

BRIEF SUMMARY

According to an embodiment of the invention, a communication gateway device to facilitate communication between at least one elevator car, a call center system, and a third party device includes a cellular communication interface including a digital cellular interface and an analog cellular interface, a wired telephone communication interface including a digital wired telephone interface and an analog wired telephone interface, and an elevator communication interface to send and receive an elevator communication to and from at least one elevator communication device associated with the at least one elevator car, the elevator communication interface associated with the cellular communication interface and the wired telephone communication interface to send and receive the elevator communication to and from at least one of the call center system and the third party device via at least one of the digital cellular interface, the analog cellular interface, the digital wired telephone interface, and the analog wired telephone interface.

In addition to one or more of the features described above, or as an alternative, further embodiments could include that the elevator communication interface is associated with the cellular communication interface and the wired telephone communication interface to send and receive the elevator communications to and from the third party device via at least one of the analog cellular interface and the analog wired telephone interface.

In addition to one or more of the features described above, or as an alternative, further embodiments could include that the elevator communication interface is associated with the cellular communication interface and the wired telephone communication interface to send and receive the elevator communications to and from the call center system via at least one of the digital cellular interface and the digital wired telephone interface.

In addition to one or more of the features described above, or as an alternative, further embodiments could include that at least one of the analog cellular interface and the analog wired telephone interface includes at least one analog to digital converter.

In addition to one or more of the features described above, or as an alternative, further embodiments could include that at least one of the digital cellular interface and the digital wired telephone interface determines at least one call center capability associated with the call center system.

In addition to one or more of the features described above, or as an alternative, further embodiments could include that the third party device is a cellular device.

In addition to one or more of the features described above, or as an alternative, further embodiments could include that the elevator communication interface provides a device identifier associated with the elevator car to the call center system.

In addition to one or more of the features described above, or as an alternative, further embodiments could include that the elevator communication interface provides a video feed associated with the elevator car to the call center system.

In addition to one or more of the features described above, or as an alternative, further embodiments could include that the elevator communication interface provides at least one remote intervention instruction associated with the call center system to the elevator.

In addition to one or more of the features described above, or as an alternative, further embodiments could include that at least one of the digital cellular interface and the digital wired telephone interface facilitates a plurality of communication sessions.

According to an embodiment of the invention, a method to facilitate communication between at least one elevator car, a call center system, and a third party device includes providing a cellular communication interface including a digital cellular interface and an analog cellular interface, providing a wired telephone communication interface including a digital wired telephone interface and an analog wired telephone interface, providing an elevator communication interface associated with the cellular communication interface and the wired telephone communication interface, sending and receiving an elevator communication to and from at least one elevator communication device associated with the at least one elevator car via the elevator communication interface, and sending and receiving the elevator communication to and from at least one of the call center system and the third party device via at least one of the digital cellular interface, the analog cellular interface, the digital wired telephone interface, and the analog wired telephone interface.

In addition to one or more of the features described above, or as an alternative, further embodiments could include sending and receiving the elevator communication to and from the third party device via at least one of the analog cellular interface and the analog wired telephone interface.

In addition to one or more of the features described above, or as an alternative, further embodiments could include sending and receiving the elevator communication to and from the call center system via at least one of the digital cellular interface and the digital wired telephone interface.

In addition to one or more of the features described above, or as an alternative, further embodiments could include that at least one of the analog cellular interface and the analog wired telephone interface includes at least one analog to digital converter.

In addition to one or more of the features described above, or as an alternative, further embodiments could include facilitating a plurality of communication sessions via at least one of the digital cellular interface and the digital wired telephone interface.

Technical function of the embodiments described above includes that the elevator communication interface associated with the cellular communication interface and the wired telephone communication interface to send and receive the elevator communication to and from at least one of the call center system and the third party device via at least one of the digital cellular interface, the analog cellular interface, the digital wired telephone interface, and the analog wired telephone interface.

Other aspects, features, and techniques of the invention will become more apparent from the following description taken in conjunction with the drawings.

BRIEF DESCRIPTION OF THE OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the FIGURE:

FIG. 1 depicts an elevator communication system in an exemplary embodiment.

DETAILED DESCRIPTION OF THE INVENTION

FIG. 1 depicts an elevator communication system 10 for use with an elevator system. In an exemplary embodiment, elevator communication system 10 includes elevator communication devices 14, gateway device 50, wired telephone system 16, cellular telephone system 18, call center system 20, and third party communication devices 22. In an exemplary embodiment, elevator communication system 10 facilitates communication between elevator communication devices 14 and call center systems 20 and third party communication devices 22 by utilizing gateway device 50 to allow analog and digital transmissions along wired telephone systems 16 and cellular telephone systems 18.

In an exemplary embodiment, elevator communication device 14 is associated with at least one elevator car 12. In certain embodiments, an elevator system can include at least one elevator car 12 to service passengers, cargo, and any other suitable contents. In an exemplary embodiment, elevator communication device 14 allows for occupants to communicate with other parties and devices, including call center systems 20 and third party devices 22. In certain embodiments, elevator communication device 14 can allow for voice communication, video communication, remote elevator diagnostics and/or remote control/intervention. In certain embodiments, elevator communication device 14 allows for multiple communication/information sessions to be simultaneously active. In certain embodiments, elevator communication device 14 utilizes digital communication methods. In other embodiments, elevator communication device 14 utilizes analog communication methods. In an exemplary embodiment, elevator communication device 14 is associated and communicates with gateway device 50 to communicate with other devices.

In an exemplary embodiment, call center system 20 can send and receive communications and information to elevator communication device 14. In certain embodiments, call center system 20 includes computer systems 24 and telephones 26 or other voice communication devices to communicate with elevator communication device 14. In certain embodiments, call center system 20 can remotely identify the elevator car 12 corresponding to the elevator communication device 14 in communication with call center system 20. In certain embodiments, call center system 20 can perform remote diagnostics upon elevator car 12 as well as may perform remote intervention and configurations. In certain embodiments, in conjunction with elevator communication device 14, call center system 20 can perform videoconference functionality. In certain embodiments, call center system 20 communications and information transmissions can be performed in multiple communication sessions. In certain embodiments, call center system 20 can dispatch technicians, notify build front desk personnel/management, etc. In an exemplary embodiment, elevator communication device 14 can determine the capabilities of the call center system 20. In certain embodiments, capabilities of a known call center system 20 associated with elevator communication device 14 are prerecorded or previously established to determine which capabilities are available.

In an exemplary embodiment, call center system 20 utilizes digital transmissions from wired telephone system 16 and/or cellular telephone system 18. In certain embodiments, call center system 20 can have proprietary transmission methods. Call center system 20 can communicate with elevator communication device 14 via gateway device 50.

In an exemplary embodiment, elevator communication device 14 can communicate with third party communication devices 22. In an exemplary embodiment, third party communication devices 22 can include building telephone systems, cellular phones, etc. In certain embodiments, elevator communication device 14 can communicate with technician cell phones. Advantageously, technicians may provide status updates while en route and on site. In an exemplary embodiment, third party communication devices 22 can utilize analog transmissions from wired telephone system 16 and/or cellular telephone system 18 to communicate with elevator communication device 14. In certain embodiments, third party communication devices 22 can transmit and receive data to and from elevator communication device 14. Advantageously, third party devices 22 allow for greater flexibility and fewer device restrictions, facilitating communication with occupants of elevator car 12. In an exemplary embodiment, third party devices 22 can communicate without a propriety equipment or dedicated connection.

In an exemplary embodiment, elevator communication system 10 can utilize a wired telephone system 16 to send and receive transmissions between elevator communication devices 14 and call center system 20 and/or third party devices 22. In certain embodiments, wired telephone system 16 can receive digital transmissions 30, 38 and analog transmissions 32, 40. In certain embodiments, wired telephone system 16 can provide any suitable transmission method to the components of elevator communication system 10.

In an exemplary embodiment, elevator communication system 10 can utilize a cellular telephone system 18 to send and receive transmissions between elevator communication devices 14 and call center system 20 and/or third party devices 22. In certain embodiments, cellular telephone system 18 can utilize GSM or any suitable cellular transmission technology. In certain embodiments, cellular telephone system 18 can receive digital transmissions 34, 38 and analog transmissions 36, 40. In certain embodiments, cellular telephone system 18 can provide any suitable transmission method to the components of elevator communication system 10.

In an exemplary embodiment, gateway device 50 faciliates communication between elevator communication device 14 and call center system 20 and/or third party communication devices 22. In an exemplary embodiment, gateway device 50 includes an elevator interface 52, a digital wired telephone interface 54, an analog wired telephone interface 56, a digital cellular telelphone interface 58, and an analog cellular telephone interface 60. Advantageously, gateway device 50 allows for the use of analog and digital transmissions over wired and cellular transmission systems.

In an exemplary embodiment, elevator interface 52 allows elevator communication device 14 to communicate with gateway device 50. In certain embodiments, elevator interface 52 utilizes digital transmission methods for communication. Gateway device 50 allows for elevator communication device 14 to communicate with call center system 20 and third party communication device 22 via wired telephone system 16 and cellular telephone system 18.

In an exemplary embodiment, digital wired transmissions 30 and analog wired transmissions 32 are associated with wired telephone system 16. In certain embodiments, digital wired transmissions 30 are sent and received by digital wired interface 54 of gateway device 50 and analog wired transmissions 32 are sent and received by analog wired interface 56 of gateway device 50. In an exemplary embodiment, analog wired interface 56 further includes an analog/digital converter 33 to convert analog wired transmissions 32 into digital transmissions to facilitate communication with other components associated with gateway device 50. Advantageously, the inclusion of such interfaces on the gateway device 50 allows for devices such as third party communication devices 22, including building phone systems, cell phones, internet (VOIP) phone systems, etc., to communicate with elevator communication device 14. Further, digital communications are allowed to facilitate enhanced functionality for call center systems 20.

In an exemplary embodiment, digital cellular transmissions 34 and analog cellular transmissions 36 are associated with cellular telephone system 18. In certain embodiments, digital cellular transmissions 34 are sent and received by digital cellular interface 58 of gateway device 50 and analog cellular transmissions 36 are sent and received by analog cellular interface 60 of gateway device 50. In an exemplary embodiment, analog cellular interface 60 further includes an analog/digital converter 37 to convert analog cellular transmissions 36 into digital transmissions to facilitate communication with other components associated with gateway device 50. Advantageously, the inclusion of such interfaces on the gateway device 50 allows for devices such as third party communication devices 22, including building phone systems, cell phones, internet (VOIP) phone systems, etc., to communicate with elevator communication device 14. Further, digital communications are allowed to facilitate enhanced functionality for call center systems 20.

In an exemplary embodiment, during operation, gateway device 50 receives communications and data from interfaces 52, 54, 56, 58, and 60. In certain embodiments, gateway device 50 identifies, prioritizes, and/or transfers data from at least one interface 52, 54, 56, 58, 60 to another target interface 52, 54, 56, 58, 60, as described above. In an exemplary embodiment, gateway device 50 can use any suitable operation method. In certain embodiments, analog to digital converters 33 and 37 allow gateway device 50 to receive, process, and transmit digital data. In certain embodiments, analog to digital converters 33 and 37 convert analog signals to digital signals before transmitting data to gateway device 50. Gateway device 50 may provide a digital signal to analog to digital converters 33 and 37 to convert outgoing signals to appropriate analog signals.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A communication gateway device to facilitate communication between at least one elevator car, a call center system, and a third party device, the communication gateway comprising:
   a cellular communication interface including a digital cellular interface and an analog cellular interface;
   a wired telephone communication interface including a digital wired telephone interface and an analog wired telephone interface; and
   an elevator communication interface that is associated with the cellular communication interface and the wired telephone communication interface, wherein the elevator communication interface of the communication gateway is configured to:
      send and receive a first and second elevator communication to and from at least one elevator communication device that is associated with the at least one elevator car,
      send and receive the first elevator communication to and from the third party device via at least one of the analog cellular interface and the analog wired telephone interface, and
      send and receive the second elevator communication to and from the call center system via at least one of the digital cellular interface and the digital wired telephone interface.

2. The communication gateway device of claim 1, wherein at least one of the analog cellular interface and the analog wired telephone interface includes at least one analog to digital converter.

3. The communication gateway device of claim 1, wherein at least one of the digital cellular interface and the digital wired telephone interface determines at least one call center capability associated with the call center system.

4. The communication gateway device of claim 1, wherein the third party device is a cellular device.

5. The communication gateway device of claim 1, wherein the elevator communication interface provides a device identifier associated with the elevator car to the call center system.

6. The communication gateway device of claim 1, wherein the elevator communication interface provides a video feed associated with the elevator car to the call center system.

7. The communication gateway device of claim 1, wherein the elevator communication interface provides at least one remote intervention instruction associated with the call center system to the elevator.

8. The communication gateway device of claim 1, wherein the communication gateway is configured to identify, prioritize, and transfer data from at least one of the digital cellular interface, the analog cellular interface, the digital wired telephone interface, and the analog wired telephone interface, to another at least one of the digital cellular interface, the analog cellular interface, the digital wired telephone interface, and the analog wired telephone interface.

9. A method to facilitate communication between at least one elevator car, a call center system, and a third party device, the method comprising:
   providing a communication gateway comprising a cellular communication interface a wired telephone communication interface, and an elevator communication interface, wherein the cellular communication interface includes a digital cellular interface and an analog cellular interface, wherein the wired telephone communication interface includes a digital wired telephone interface and an analog wired telephone interface, and wherein the elevator communication interface is associated with the cellular communication interface and the wired telephone communication interface;
   sending and receiving, by the elevator communication interface of the communication gateway, first and second elevator communications to and from at least one elevator communication device that is associated with the at least one elevator car;
   sending and receiving, by the elevator communication interface of the communication gateway, the first elevator communication to and from the third party device via at least one of the analog cellular interface and the analog wired telephone interface; and
   sending and receiving, by the elevator communication interface of the communication gateway, the second elevator communication to and from the call center system via at least one of the digital cellular interface and the digital wired telephone interface.

10. The method of claim 9, wherein at least one of the analog cellular interface and the analog wired telephone interface includes at least one analog to digital converter.

11. The method of claim 9, wherein the communication gateway is configured to identify, prioritize, and transfer data from at least one of the digital cellular interface, the analog cellular interface, the digital wired telephone interface, and the analog wired telephone interface, to another at least one of the digital cellular interface, the analog cellular interface, the digital wired telephone interface, and the analog wired telephone interface.

* * * * *